Patented Mar. 18, 1924.

1,487,145

UNITED STATES PATENT OFFICE.

MARTINUS HENDRICUS CARON, OF THE HAGUE, NETHERLANDS, ASSIGNOR TO CLEVENGER & CARON, OF BOSTON, MASSACHUSETTS, A FIRM.

PROCESS OF RECOVERING VALUES FROM NICKEL AND COBALT-NICKEL ORES.

No Drawing.   Application filed May 25, 1923.   Serial No. 641,506.

*To all whom it may concern:*

Be it known that I, MARTINUS HENDRICUS CARON, a subject of the Queen of the Netherlands, residing at The Hague, Netherlands, have invented certain new and useful Improvements in and Relating to Processes of Recovering Values from Nickel and Cobalt-Nickel Ores, of which the following is a specification.

My present invention relates to processes of treating ores, more especially to the recovery of nickel and cobalt from oxide and hydrated silicate nickel and cobalt ores. Copper, if present in the ores, is recovered along with the cobalt and nickel values. In case the ores occur as sulfides, or arsenides, a preliminary roasting will convert them into oxides, and the further treatment is the same as for natural oxide and silicate ores.

It is generally known that said ores cannot be satisfactorily extracted by acid or by another hydrometallurgical treatment. All processes of this kind have the disadvantage that in addition to the values nickel and cobalt and copper if present a considerable part of the gangue and base-metals, for instance, silica, magnesium, iron, manganese etc. are dissolved whereby the consumption of chemicals becomes prohibitive. Moreover, this is not the only drawback, seeing that the separation of the values from the solutions heavily charged with impurities is often a problem per se.

My present invention avoids the said disadvantages as with my novel process almost exclusively nickel and cobalt and copper if present are extracted whereas the other compounds, gangue and base metals are practically not attacked. Moreover, the liquor for extracting the values in accordance with my invention may be used in cyclus, whereby the consumption of chemicals is minimized to the very limit.

According to my invention, the oxide or hydrated silicate ore, preferably after being crushed, or the product obtained by subjecting an arsenide or sulfide ore to a preliminary oxidizing roast, is first subjected to a reducing roast by producer gas, wood gas or any other suitable generator gas or reducing agent, either gaseous or solid. This may be done either by directly heating the ore in the reducing atmosphere, or by first heating the ore to the proper temperature and thereafter subjecting it to the action of reducing agents. The reduction temperature depends on the kind of ore treated, the average temperature being say 750°–800° C. Higher temperatures may be used, but as viewed from the standpoint of fuel economy they have little advantage. The addition of a small amount of sodium chloride tends to lower the required reduction temperature.

The dark looking reduced ore is liable to reoxidize and consequently to again be converted into less soluble compounds when exposed to the air while hot, so that the reduced ore should be cooled to the required degree either in a non-oxidizing or reducing atmosphere, or by chilling the hot or partially cooled ore in water out of contact with air, or in any other suitable manner which will prevent oxygen from getting access to the hot ore.

After reduction the ore is dark coloured and magnetic owing to the formation of amorphous metallic nickel.

As to the preliminary treatment, this corresponds with the one disclosed in my prior U. S. Patent No. 1,346,175 (July 13, 1920). However, the problem to extract the values from the reduced ore without at the same time dissolving considerable amounts of the base metals and other impurities present, has not been solved by my aforesaid patent. In this connection it should be borne in mind that acids, acid salts etc. all more or less attack silica, magnesia, manganese, iron, etc.

In the present process, all the disadvantages of having to extract the nickel and cobalt and copper if present from heavily contaminated solutions have been eliminated by the use of ammoniacal solutions of ammonium carbonate, in which properly reduced nickel and cobalt and copper if present are readily soluble. Only traces of ferrous compounds and very small amounts of magnesium may still contaminate the ammoniacal solutions, and these impurities can be precipitated simply by heating the solution. The ammoniacal ferrous compounds quickly oxidize whereby ferric hydroxide is precipitated, whereas ammonium magnesium carbonate decomposes at 60° into ammonia and insoluble magnesia alba, leaving after filtration very pure solutions of nickel or both nickel and cobalt.

From these solutions nickel, or nickel and cobalt and copper if present, may be recovered in a very pure form, for instance by distilling the volatile ammonium compounds off, leaving the metal as carbonate as far as nickel is concerned, but precipitating copper as an oxide, from which pure metals, or the desired metal compounds can easily be recovered. The ammonia is recovered and again used in the process as a fresh, clean solution.

It is obvious that the values may also be recovered by other known methods, for instance, by precipitating the nickel and the cobalt values and copper if present by sodium sulfide etc.

I claim:

1. Process of recovering values from nickel and cobalt and nickel-cobalt ores which comprises subjecting the ore to a preparatory reducing roast, cooling the reduced ore under non-oxidizing conditions, extracting values from the reduced and cooled ore by treatment with an ammonium salt solution, and precipitating the values from the ammonium salt solution by distilling volatile ammonium compounds therefrom.

2. Process of recovering values from nickel and cobalt and nickel-cobalt ores as defined in claim 1 in which an ammoniacal ammonium salt solution is employed for extracting the values from the reduced and cooled ore.

3. Process of recovering values from nickel and cobalt and nickel-cobalt ores as defined in claim 1 in which an ammoniacal ammonium carbonate solution is employed for extracting the values from the reduced and cooled ore.

4. Process of recovering values from nickel and cobalt and nickel-cobalt ores as defined in claim 1 in which the ammonium salt solution of the values is heated to a temperature sufficient to produce precipitation of the impurities and thereafter separating the solution from the precipitated impurities and precipitating the pure values therefrom.

5. Process of recovering values from nickel and cobalt and nickel-cobalt ores as defined in claim 1 in which the volatile ammonium compounds distilled in the step of precipitating the values from the ammonium salt solution are recovered and used for dissolving values from reduced and cooled ore in a succeeding operation.

6. Process of recovering values from nickel and cobalt and nickel-cobalt ores as defined in claim 1 in which the ore is subjected to a preliminary oxidizing roast.

In testimony whereof I affix my signature.

MARTINUS HENDRICUS CARON.